(12) United States Patent  
Sung et al.

(10) Patent No.: US 7,674,031 B2  
(45) Date of Patent: Mar. 9, 2010

(54) OPTICAL FILM AND BACKLIGHT SYSTEM USING THE SAME

(75) Inventors: Yi-Ting Sung, Taipei (TW); Chia-Wei Yu, Yilan County (TW); Yu-Nan Pao, Hsinchu County (TW)

(73) Assignee: Industrial Technology Research Institute, HsinChu (TW)

( * ) Notice: Subject to any disclaimer, the term of this patent is extended or adjusted under 35 U.S.C. 154(b) by 37 days.

(21) Appl. No.: 12/234,800

(22) Filed: Sep. 22, 2008

(65) Prior Publication Data

US 2009/0154197 A1    Jun. 18, 2009

(30) Foreign Application Priority Data

Dec. 13, 2007 (TW) .............................. 96147683 A  
Sep. 17, 2008 (TW) .............................. 97135649 A

(51) Int. Cl.  
*F21V 7/04* (2006.01)  
*G02B 5/04* (2006.01)

(52) U.S. Cl. ................. 362/624; 362/626; 362/618; 362/326; 359/837; 349/64

(58) Field of Classification Search ................. 362/624, 362/625, 626, 615, 618, 326, 336; 359/592, 359/640, 837, 599; 349/64  
See application file for complete search history.

(56) References Cited

U.S. PATENT DOCUMENTS

| | | | |
|---|---|---|---|
| 4,791,540 A | 12/1988 | Dreyer, Jr. et al. | |
| 4,984,144 A * | 1/1991 | Cobb et al. ................. | 362/339 |
| 5,863,113 A | 1/1999 | Oe et al. | |
| 6,576,887 B2 * | 6/2003 | Watson et al. ........... | 250/227.11 |
| 6,997,595 B2 * | 2/2006 | Mi et al. ..................... | 362/626 |
| 7,474,464 B2 * | 1/2009 | Wang et al. ................. | 359/599 |
| 7,529,048 B2 * | 5/2009 | Lin ............................. | 359/831 |
| 2003/0214720 A1 * | 11/2003 | Bourdelais et al. .......... | 359/599 |

* cited by examiner

*Primary Examiner*—Ali Alavi  
(74) *Attorney, Agent, or Firm*—WPAT., P.C.; Justin King

(57) ABSTRACT

An optical film with a plurality of micro structures which are capable of collecting incident light to the frontal and normalized view angle of the optical film for reducing the chance of incident light returning to light guild plate so as to enhance light collecting efficiency is provided in the present invention. In an embodiment, the optical film is combined with a flat light source so as to form a backlight system. By means of the merit of the optical film, the quantities of the optical film can be reduced so that the backlight system can have characteristics of thin thickness and low production cost.

25 Claims, 13 Drawing Sheets

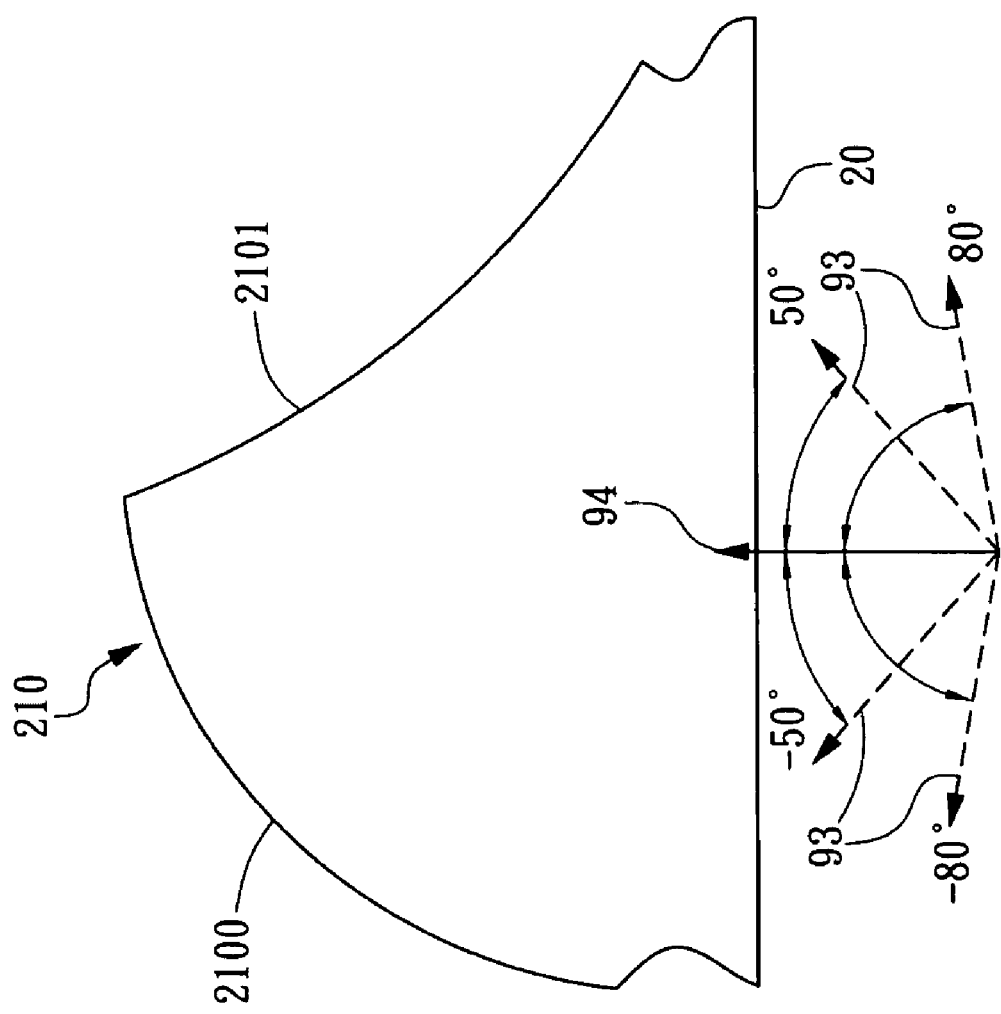
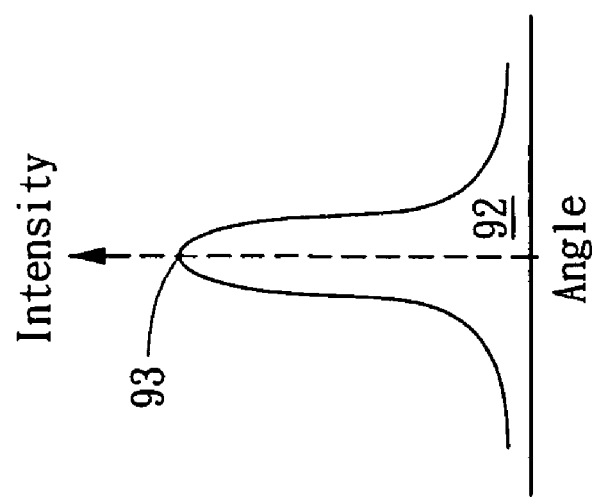
FIG. 3B
FIG. 3A

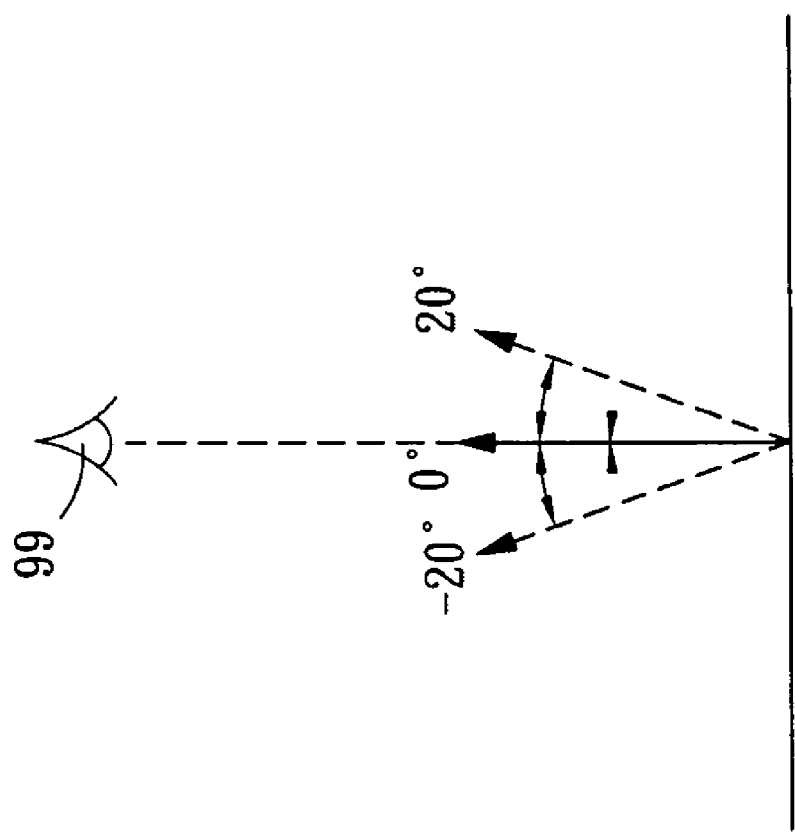

OPTICAL FILM AND BACKLIGHT SYSTEM USING THE SAME

FIELD OF THE INVENTION

The present invention relates to an optical modulation means, and more particularly, to an optical film capable of collect an incident light thereof to its frontal and normalized view angle, and thereby, increasing the brightness of the normal direction of a backlight system using the same.

BACKGROUND OF THE INVENTION

Nowadays, it is commonly seen that backlight modules are used in electronic devices with planar displays, which includes devices as small as hand-held palm pilots and as large as big-screen TVs. The design challenge of a backlight module is to generate uniform illumination across the LCD surface and luminance that is high enough to produce good contrast in a day environment, so that most backlight modules had configured therein a brightness enhancement film (BEF) or a dual brightness enhancement film (DBEF) for such light management. It is noted that most optical film used in backlight module, such as a BEF or a DBEF, is thin matte surface reflective polarizer with tiny triangular structures on the film surface, as that shown in FIG. 1A. Conventionally, for enabling an optical film to guide an incident light thereof to its frontal and normalized view angle of the backlight module while enhancing the light emission efficiency of the same, the optical film can be a film fabricated from at least two overlapping BEFs or DBEFs for enhancing collecting light ability. Please refer to FIG. 1B, which is a schematic diagram showing light paths of beams traveling in a conventional optical film. In FIG. 1B, only a potion of the optical field generated from the light guide plate 11 and guided toward the optical film 10, represented by the light 91, is going to travel pass the optical film 10 by a direction normal to the light-emitting surface of the optical film 10 while the rest of the optical field, represented by the light 91, will be guided back to the light guide plate 11, by that the light emission efficiency of the optical film 10 is adversely affected as the light is directed to travel back and forth in the optical film 10.

In U.S. Pat. No. 4,791,540, entitled "Light fixture providing normalized output", an optical structure is provided which is substantially a light guide plate having two optical films placed thereon while each optical film is configured with microstructures on a surface thereof. The aforesaid optical structure is capable of enabling light to be reflected back and forth between the two films and the light guide plate so as to provide normalized output. Instead of modifying the optical field of the light guide plate itself, the optical structure will reflect to optical field back to the light guide plate where it is redistributed and scattered so as to be redirected to the optical film for emitting. As the microstructure formed on the optical film is going to refract those incident beams of certain specific incident angles for enabling the same to be emitted away from the normal of the optical film while enabling others to be refracted/reflected back to the light guide plate where they are redistributed and scattered so as to be redirected to the optical film in an back and forth manner until they are able to be emitted away from the normal of the optical film. Thereby, eventually all the beams from the light guide plate will be emitted away from the normal of the optical film so that the luminous efficiency is enhanced. However, also because of the light is reflected back and forth between the optical films and the light guide plate, the energy of the light is lost during the process by a great amount.

In U.S. Pat. No. 5,863,113, entitled "Plane light source unit", an optical film with microstructure being adapted for backlight module is provided, in which the plural prism units formed on the optical film on a surface thereof facing toward a light guide plate will reflect/refract the beams emitted from the light guide plate for enabling the same to be emitted away from the normal of the optical film. The aforesaid optical film is able to provide a normalized output directly without having the beams to be reflected back and forth between the optical film and the light guide plate. However, the friction between the prism units of the optical film and the light guide plate is going to cause damage to the prism units, defecting the backlight module accordingly.

SUMMARY OF THE INVENTION

The present invention is to provide an optical film capable of modulating beams emitted from a light guide plate by the use of microstructures formed thereon so as to collect an incident light thereof to its frontal and normalized view angle, and thereby, increasing the brightness of the normal direction of a backlight system using the same.

It is another object of the invention to provide a backlight system, capable of using a single optical film to collect an incident light thereof to its frontal and normalized view angle for eliminating the energy loss happening during the light reflected back and forth between the optical film and the light guide plate, by that not only the frontal bright of the backlight system is enhanced, but also the amount of optical film required in the backlight system is reduced.

Yet, another object of the invention is to provide a backlight system, capable of using a optical film to modulate an optical film incident thereto effectively so as to enhancing its light emission efficiency with less light sources required.

In an exemplary embodiment of the invention, an optical film is provided which comprises: an entrance surface, for receiving an incident light where it is refracted inside the optical film to form a refracted optical field; and an exit surface, having a plurality of microstructures formed thereon, each microstructure being configured with a first curved surface and a second curved surface; wherein by the cooperation of the first and the second curved surfaces, the refracted optical field is collected to a frontal and normalized view angle of the exit surface where it is emitted.

In another exemplary embodiment of the invention, a backlight system is provided, which comprises: a planar light source; and an optical film, arranged at a side of the planar light source for receiving an incident light provided from the planar light source; wherein the optical film further comprises: an entrance surface, for receiving the incident light where it is refracted inside the optical film to form a refracted optical field; and an exit surface, having a plurality of microstructures formed thereon, each microstructure being configured with a first curved surface and a second curved surface for working cooperatively to collect the refracted optical field to a frontal and normalized view angle of the exit surface where it is emitted.

Further scope of applicability of the present application will become more apparent from the detailed description given hereinafter. However, it should be understood that the detailed description and specific examples, while indicating several embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 3A and FIG. 3C respectively show an incident light and its distribution.

FIG. 3D is a schematic diagram showing how an optical field resulting from an optical film of the invention is to be viewed.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1A:
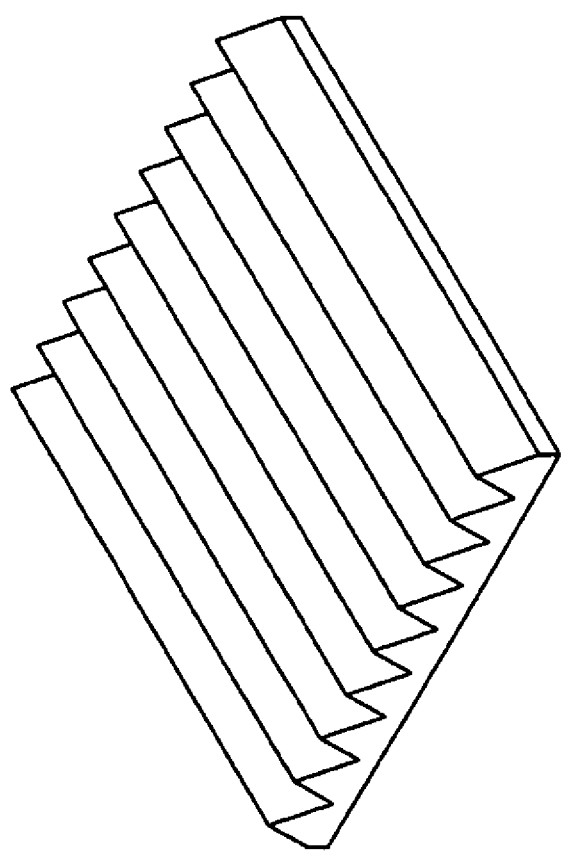
FIG. 1A shows a conventional optical film.
Figure 1B:
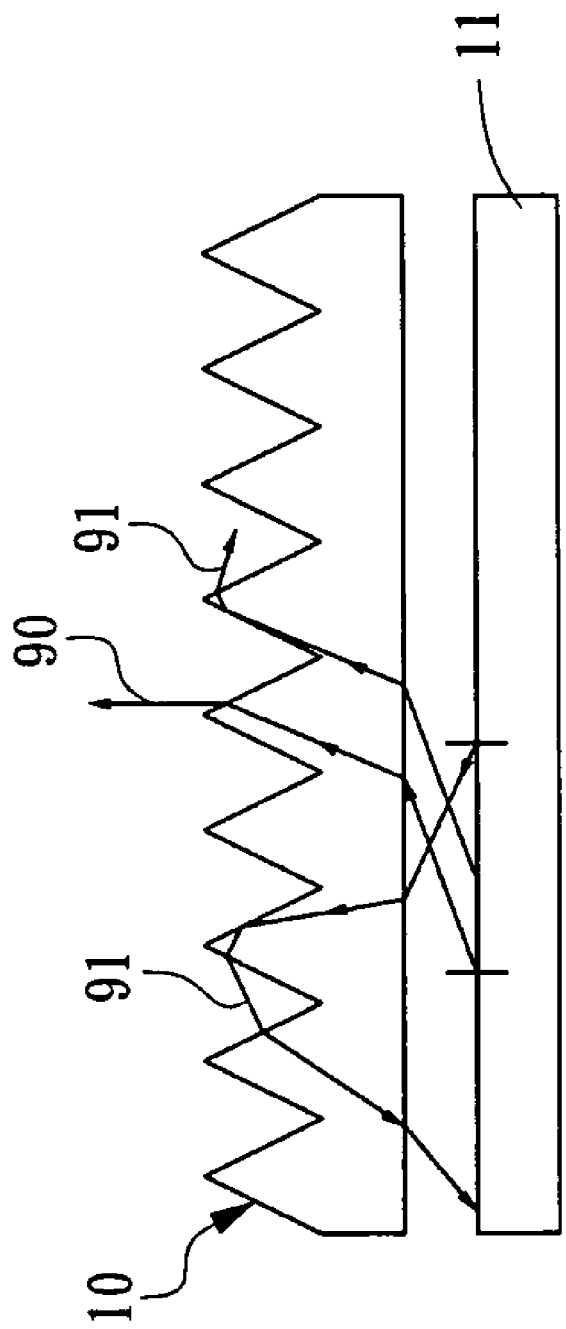
FIG. 1B is a schematic diagram showing light paths of beams traveling in a conventional optical film.
Figure 2:
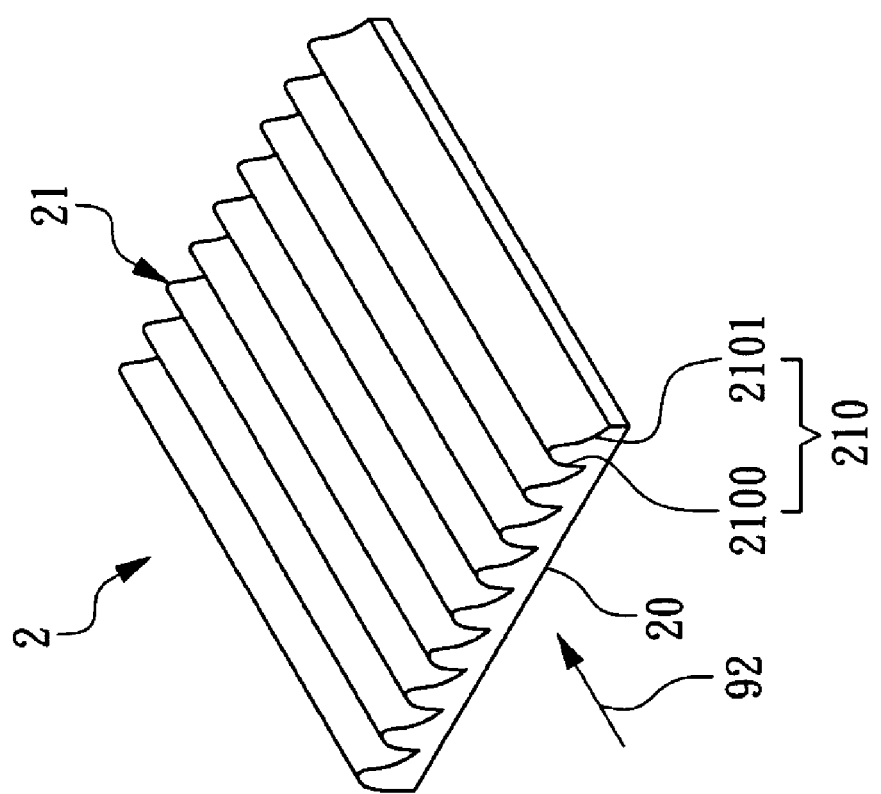
FIG. 2 is a schematic diagram showing an optical film according to a first embodiment of the invention.

Please refer to FIG. 2, which is a schematic diagram showing an optical film according to a first embodiment of the invention. In FIG. 2, the optical film 2 is configured with an entrance surface 20 and an exit surface 21. The entrance surface 20 is used for receiving an incident light 92 where it is refracted inside the optical film 2 to form a refracted optical field. The exit surface 21 has a plurality of microstructures 210 formed thereon, in which each microstructure 210 is configured with a first curved surface 2100 and a second curved surface 2101, and by the cooperation of the first and the second curved surfaces 2100, 2101, the refracted optical field is collected to a frontal and normalized view angle of the exit surface 21 for enabling it to be emitted by an angle range centering about the frontal and normalized view angle. It is noted that the angle range is determined by actual requirement.

Figure 3C:
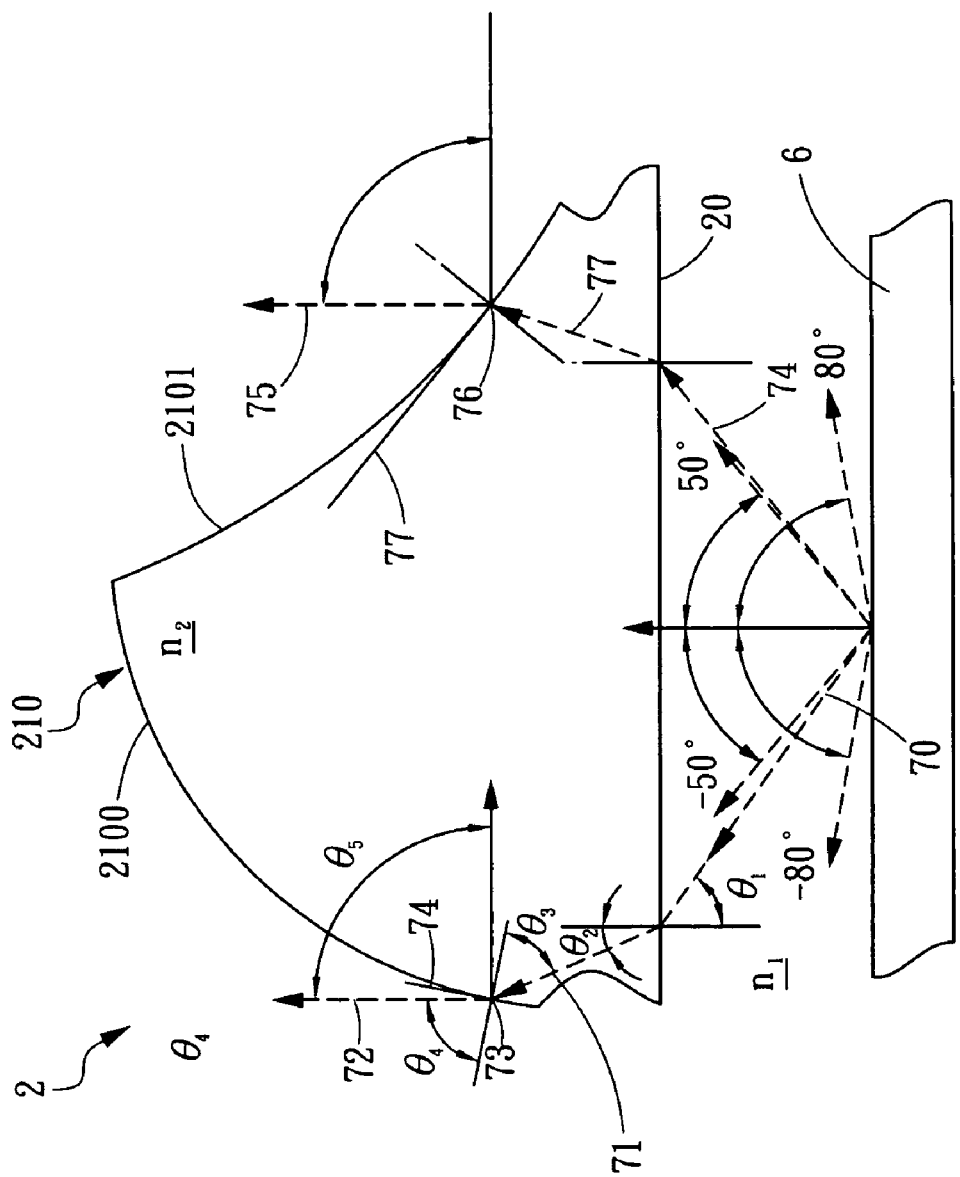

Please refer to FIG. 3A and FIG. 3C, which respectively show an incident light and its distribution. In FIG. 3A, the incident light 92 has a characteristic peak energy intensity 92. In the exemplary embodiment shown in FIG. 3B, an included angle formed between the normal 94 of the entrance surface 20 and the peak 93 of the incident light 92 as it is impinging upon the entrance surface 20 is ranged between −50 degrees and −80 degrees, or between 50 degrees and 80 degrees. Please refer to FIG. 3C, which shows the relationship between the slope of a tangent line at any point on the first curved surface 2100 and the second curved surface 2100 of FIG. 3B with its corresponding output optical field. Taking the first curved surface 2100 and the first incident light 70 for instance as the first incident light 70 is represented as a single light beam in FIG. 3C despite that its energy is distributed mainly between −50 degrees and −80 degrees, the incident angle $\theta_1$ of the incident light 70 with respect to the entrance surface 20 is determined as soon as it impinges upon the entrance surface 20 and enters the microstructure 210, and thereby, assuming the refraction index of the ambient environment is $n_1$ and the refraction index of the microstructure 210 is $n_2$, the refraction angle $\theta_2$ of the first refracted light 71 caused by the refraction of the microstructure upon the first incident light 70 can also be acquired according to the Snell's law, as the formula (1) described hereinafter.

The design of the optical film of the invention is to guide the first incident light 72 emitted from the first curved surface 2100 to a frontal and normalized view angle of the exit surface 21 where it is emitted by an angle range centering about the frontal and normalized view angle. As shown in FIG. 3D, the frontal and normalized view angle of the exit surface 21, about which the refracted light is collected and then to be emitted out of the optical film by an angle range centering about the frontal and normalized view angle with respect to a viewer 99, can be 0 degree or the ±20 degrees angle range as shown in FIG. 3D, but is not limited thereby. Thus, when the emitting angle of a first output light 72 is determined to be 90 degrees, i.e. perpendicular to the water level, its corresponding tangent slope at the emitting point 73 of FIG. 3C can also be acquired since it must satisfy the Snell's law, as the formula (2) described hereinafter. That is, when the emitting angle of a first output light 72 is determined, the incident angle $\theta_3$ and the emitting angle $\theta_4$ of the first refracted light 71 at the point 73 are determined. For instance, when the emitting angle of first output light 72 is defined to be 90 degrees, the total of the refraction angle $\theta_2$ and the included angle between the first refracted light 71 and the first output light 72 is 180 degrees. Accordingly, it is able to find a tangent slope at the refraction point 73 to be used for causing the resulting incident angle $\theta_3$ and the emitting angle $\theta_4$ to satisfy the formula (2).

Thus, the relationship between the incident angle $\theta_1$ of the incident light 70 and the incident angle $\theta_3$ of the first refracted light 71 at the first curved surface 2100 is defined by a function for collecting the first output light 72 to the frontal and normalized view angle. By the aforesaid function, the structure of the first curved surface 2100, being a curved surface composed of a plurality of refracted points 73, can be determined for enabling light to be emitted out of the first curved surface 2100 by a specific angle range centering about the frontal and normalized view angle with respect to a viewer 99. Similarly, for the second incident light 77 whose energy is concentrated between 50 degrees and 80 degrees, the relationship between its incident angle and the incident angle of the corresponding second refracted light 77 at the second curved surface 2101 is defined by the function for collecting the corresponding second output light 75 to the frontal and normalized view angle when it is refracted to form a second refracted light 77 by the incident surface 20 and then the second refracted light is further being refracted at the refraction point 76 on the second curved surface 2101 to form a second output light 75. Therefore, also by the aforesaid function, the structure of the second curved surface 2101, being a curved surface composed of a plurality of refracted points 76, can be determined for enabling light to be emitted out of the second curved surface 2101 by a specific angle range centering about the frontal and normalized view angle with respect to a viewer 99.

$$n_1 \sin \theta_1 = n_2 \sin \theta_2 \quad (1)$$

$$n_2 \sin \theta_3 = n_1 \sin \theta_4 \quad (2)$$

Figure 4A:
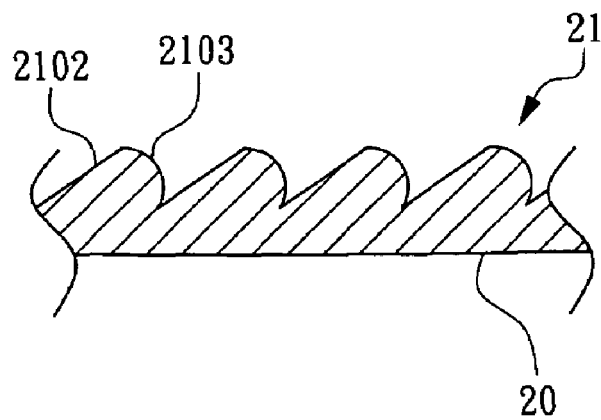
FIG. 4A to FIG. 4C are cross-sectional diagrams respectively showing a variety of microstructures formed on an optical film of the invention.
Figure 4B:
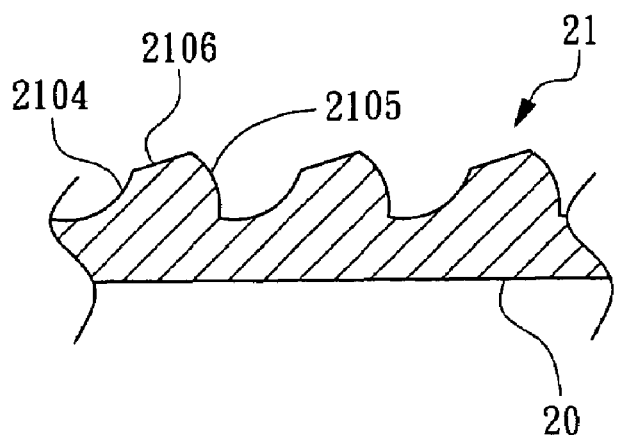
Figure 4C:
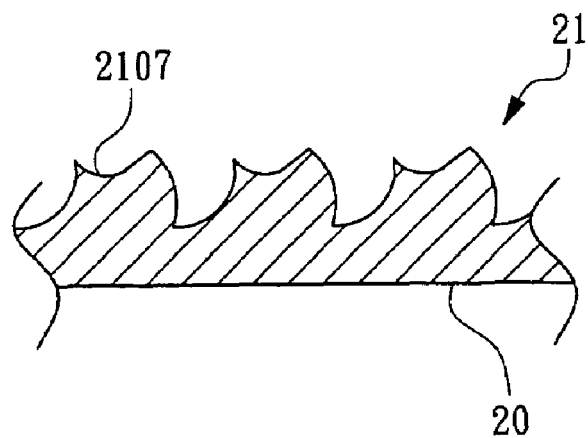

Please refer to FIG. 4A to FIG. 4C, which are cross-sectional diagrams respectively showing a variety of microstructures formed on an optical film of the invention. It is noted that both of the first and the second curved surfaces of any microstructure 210 can be respectively defined by a curvature function selected from the group consisting of a planar function, a spherical function, a non-spherical function and an irregular curved surface function. In FIG. 4A, the first curve surface 2102 is a planar surface while the second curved surface 2103 is an arc defined by a spherical function. In FIG. 4B, the first curve surface 2104 and the second curved surface 2105 is connected by a third curved surface 2106 which is a planar surface in this embodiment, however it also can be defined by a planar function, a spherical function, a non-spherical function or an irregular curved surface function. In FIG. 4C, the third curved surface 2107 is an arc defined by a spherical function. It is noted that the plural microstructures formed on the optical film can be the combination of those shown in FIG. 4A, FIG. 4B and FIG. 4C and the like.

Figure 5:
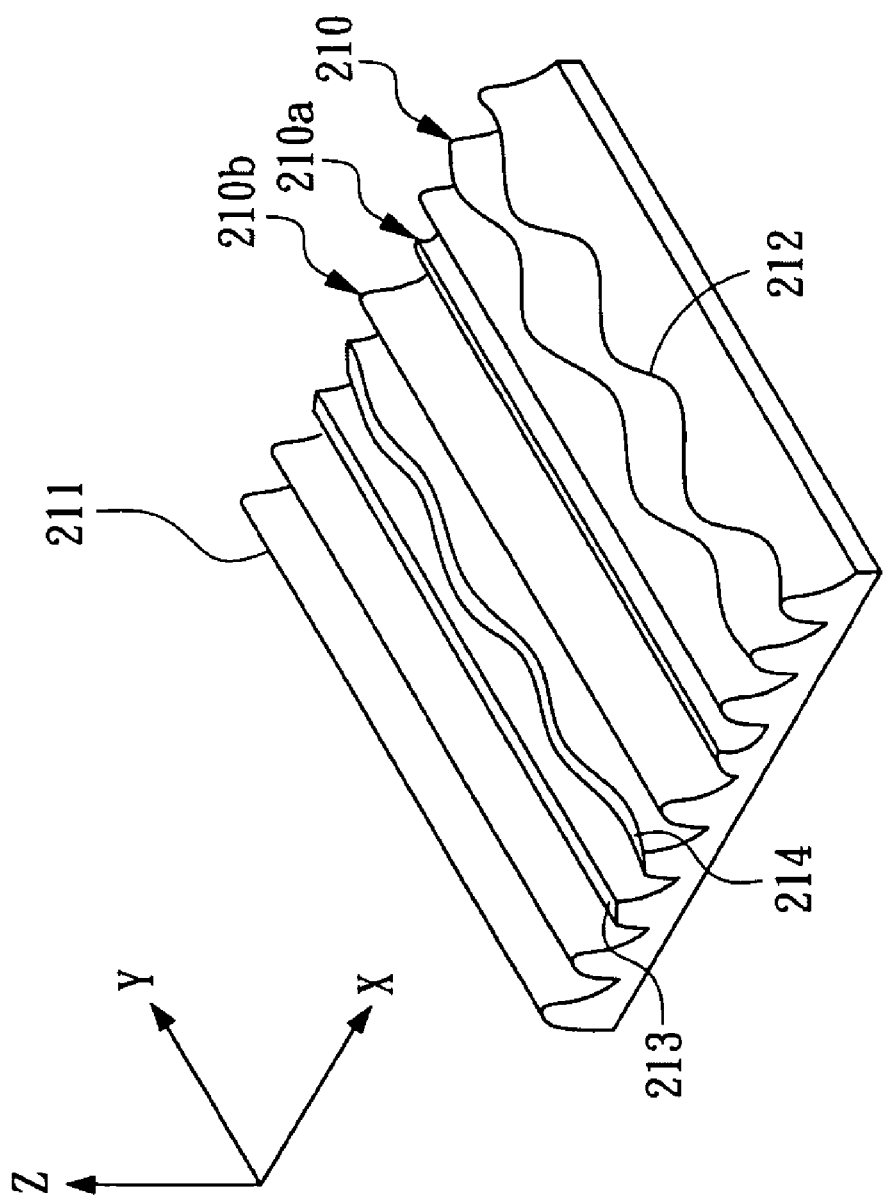
FIG. 5 is a schematic diagram showing an optical film according to a second embodiment of the invention.
Figure 6:
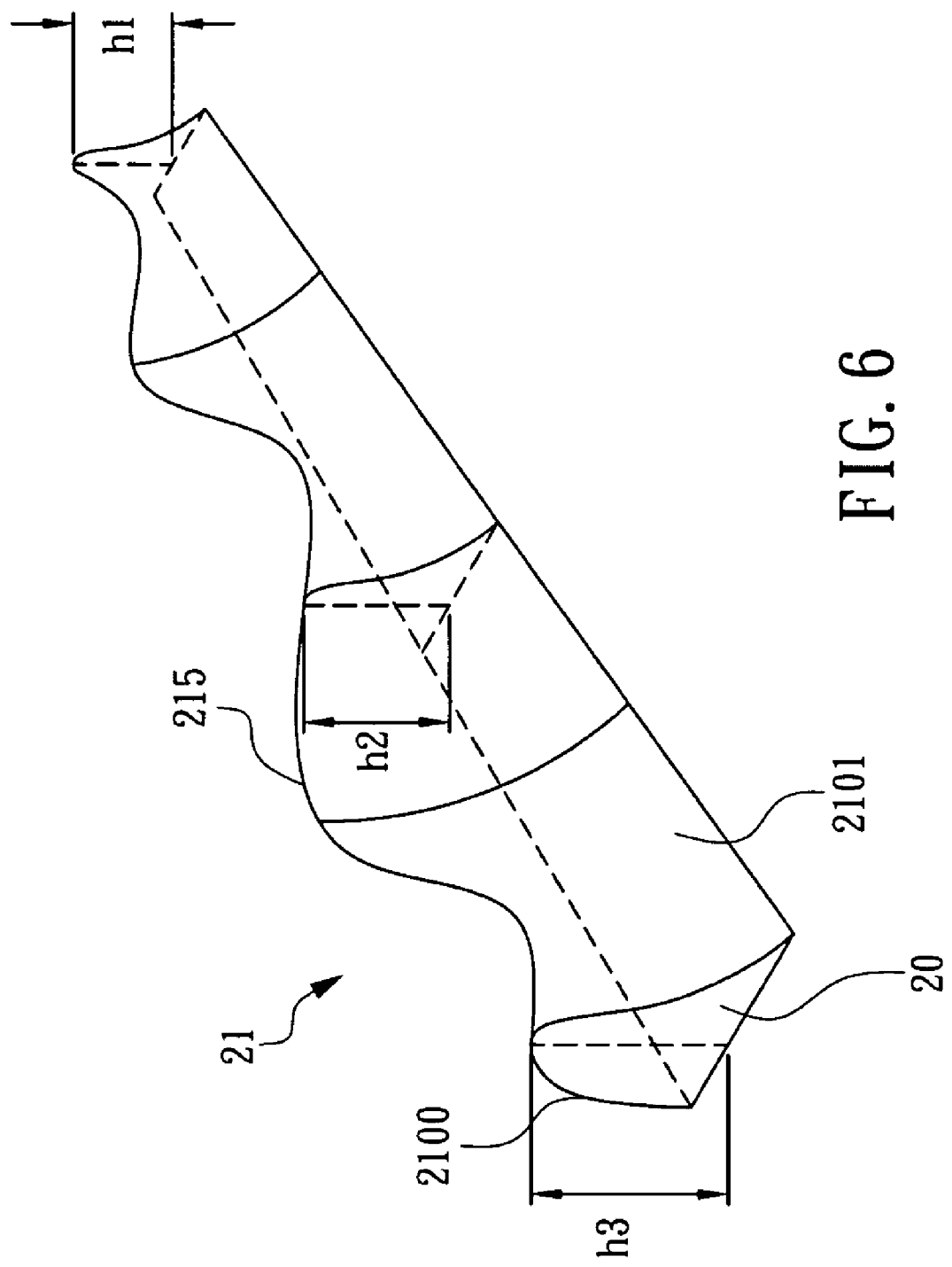
FIG. 6 is a three-dimensional view of a microstructure formed on an optical film of the invention.

Please refer to FIG. 5, which is a schematic diagram showing an optical film according to a second embodiment of the invention. In this second embodiment, each microstructure 210 is extending following a track defining by a function selected from the group consisting of a linear function and a curve function. As shown in FIG. 5, the track of the microstructure 210 extending in the Y-direction can be a straight line 211, a curve 212, a planar surface 213 or a curved surface 214. In addition, the extending track of any of the plural microstructures can be different from or the same as those of its neighboring microstructures; and the height of each microstructure is formed in a manner selected from the group consisting of: enabling the height to remain unchanged along with the extending of the same, and enabling the height of the microstructure to undulate along with the extending of the same. In FIG. 5, those microstructures 210 are all of the same height with respect to the Z-direction. Please refer to FIG. 6, which is a three-dimensional view of a microstructure formed on an optical film of the invention. In FIG. 6, the height of the microstructure 210 is formed in a manner that its height is undulating along with the extending track 215 of the same with respect to the Z-direction. There are three heights h1, h2, and h3 defined in FIG. 6 in correspondence to three different location of the microstructure 210 that are all different from each other. It is noted that the height of any of the plural microstructures can be different from or the same as those of its neighboring microstructures. For instance, in the microstructures shown in FIG. 5, the height of the microstructure 210a is different from that of the microstructure 210b.

Figure 7A:
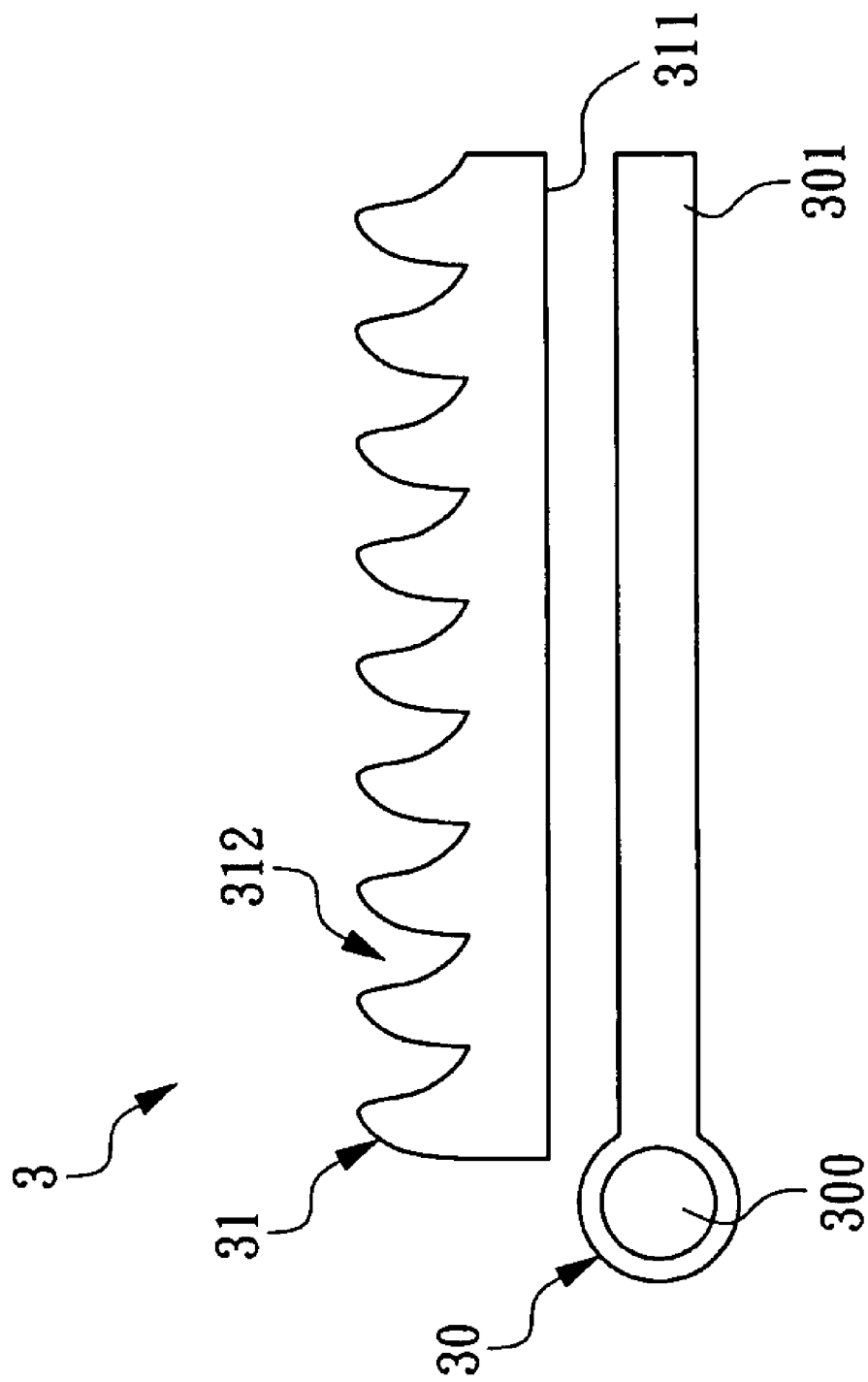
FIG. 7A is a schematic view of a backlight system according to the present invention.
Figure 7B:
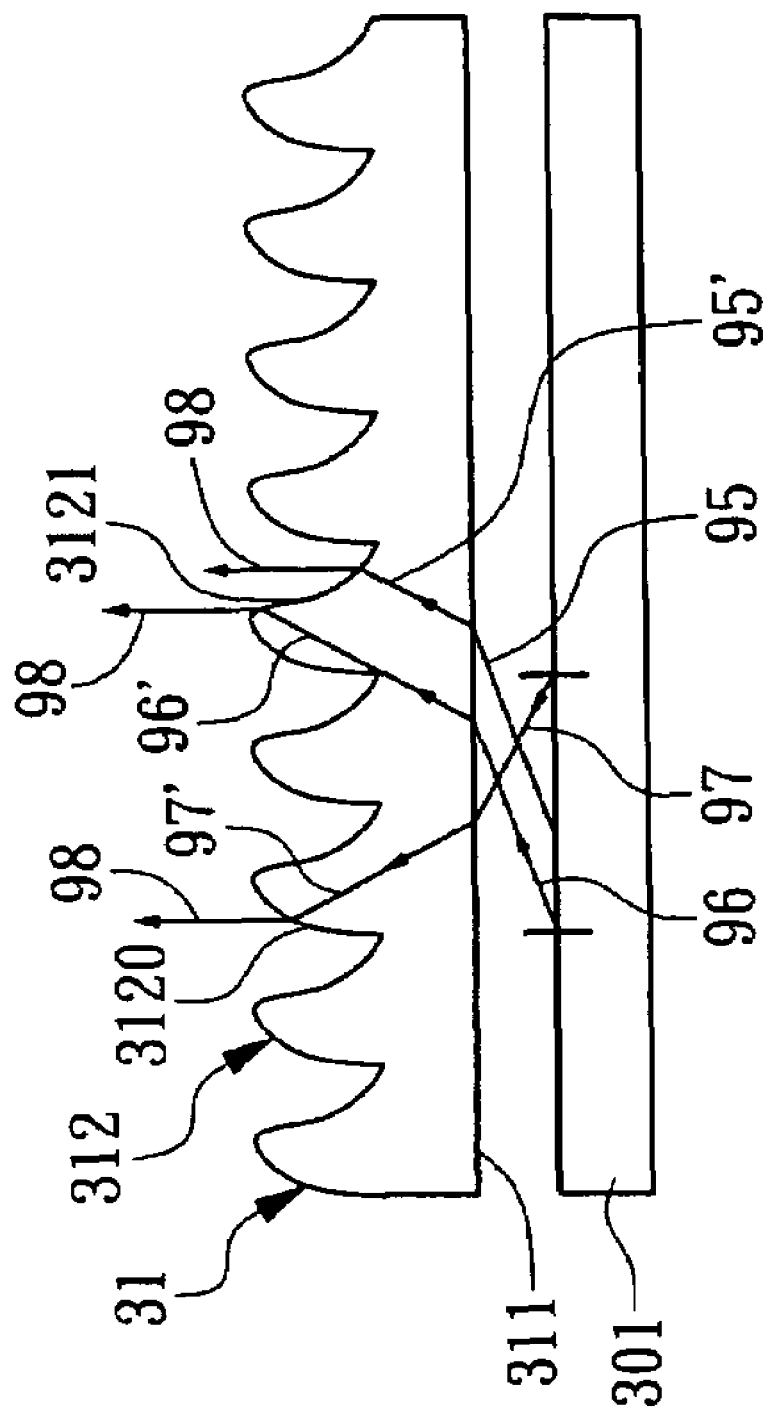
FIG. 7B is a schematic diagram showing light paths of beams traveling in a backlight system of the invention.

Please refer to FIG. 7A, which is a schematic view of a backlight system according to the present invention. The backlight system 3 comprises a planar light source 30 and an optical film 31, in which the planar light source 30 is composed of a light source 300 and a light guide plate 301 whereas the light source 300 can be a light emitting diode or a cold cathode fluorescent lamp, but is not limited thereby. It is noted that the use of the planar light source is familiar to those skilled in the art and thus is not described further herein. Moreover, the light guide plate 301 used in the backlight system 3 can be paired with any one optical film selected from the aforesaid embodiments. In the embodiment shown in FIG. 7A, the optical film of FIG. 2 is used for illustration. Please refer to FIG. 7B, which is a schematic diagram showing light paths of beams traveling in a backlight system of the invention. In FIG. 7B, incident lights 95, 96 and 97 provided from the light guide plate 301 will shine on the entrance surface 311 where they are refracted and thus enter inside the optical film 31 to form the refracted optical fields 95', 96', and 97', in which the refracted optical fields 95' and 96' will be collimated by the second curved surface 3121 of the microstructure 312 for collecting the same to their frontal and normalized view angle, forming output optical fields 98, while the refracted optical field 97' is collimated by the first curved surface 3120 for collecting the same to its frontal and normalized view angle, forming another output optical field 98.

In FIG. 7A, the microstructures formed on the optical film can be designed specifically for the incident light provided from the light guide plate 301 so that the probability of light being reflected and thus return back to the light guide plate after it had already traveled into the optical film is greatly reduced. Therefore, the energy usage efficiency with respect to the frontal and normalized view angle of its optical film is significantly higher than those of the conventional backlight modules using prisms.

Figure 8A:
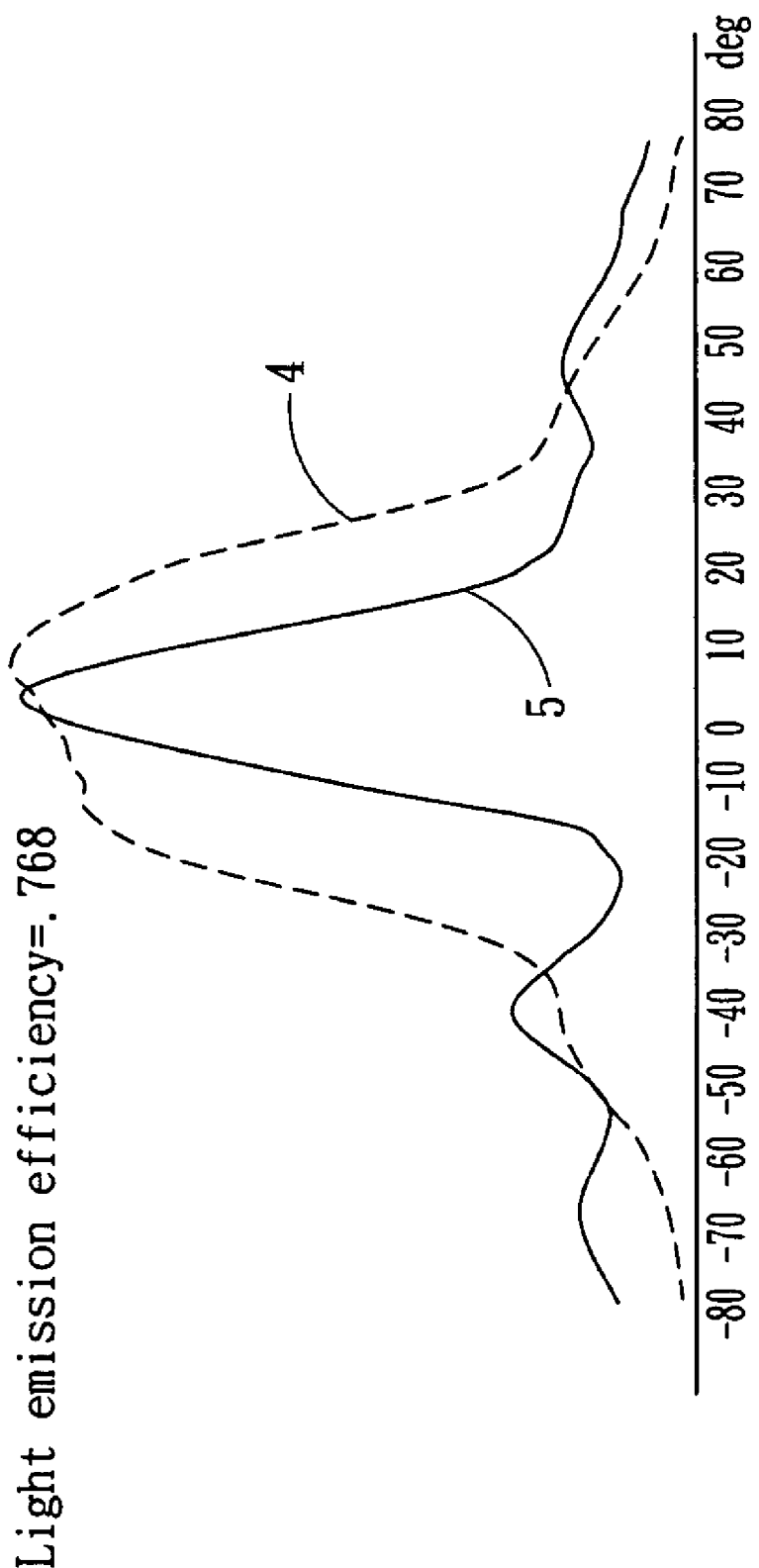
FIG. 8A is a simulation depicting the light emission efficiency of the backlight system of FIG. 7A.
Figure 8B:
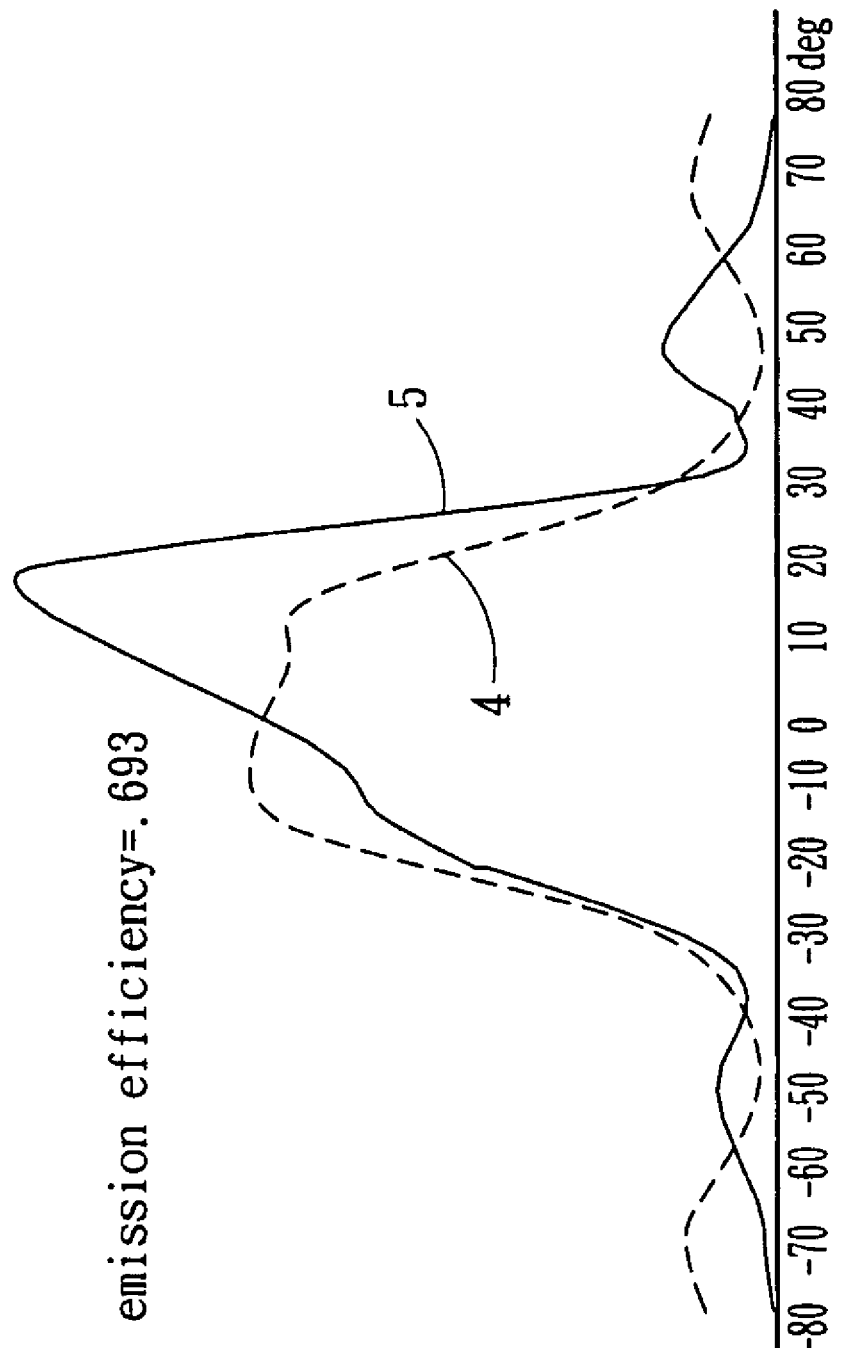
FIG. 8B is a simulation depicting the light emission efficiency of a conventional backlight system using two brightness enhancement films.

Since the incident light provided from the light guide plate is characterized in its peak and frequency as that shown in FIG. 3A, the optical film 31 of the invention is configured with microstructures of curved-surface design so as to refract its peak for effectively concentrating more light energy to the frontal and normalized view angle of the optical film while preventing the light from reflecting back to the light guide plate to form a scattered optical field, and consequently, the light energy is distributed as a semi-Gaussian distribution within a narrow frequency range. Therefore, by the use of only a single optical film of the invention, it is able to achieve the same effect that was used to required two brightness enhancement films, as those shown in FIG. 8A and FIG. 8B. FIG. 8A is a simulation depicting the light emission efficiency of the backlight system of FIG. 7A, and FIG. 8B is a simulation depicting the light emission efficiency of a conventional backlight system using two brightness enhancement films (BEFs). In FIG. 8A and FIG. 8B, the solid curve 4 represents the optical field intensity distribution of a vertical light source and the dotted curve 5 represents the optical field intensity distribution of a parallel light source. By comparing FIG. 8A and FIG. 8B, it is noted that not only the center light intensity obtained from the optical film of the invention is higher that that form the use of two BEFs, but also the light emission efficiency of the backlight system using the optical film of the invention is 77% which is also higher than the 70% of using two BEFs.

To sum up, the present invention provides an optical film and the backlight system using the same, that as the microstructures formed on the optical film is designed specifically for matching with the optical field of its light guide plate, most of light from the light guide plate can be collected directly to its frontal and normalized view angle while reducing the energy loss happening during the light reflected back and forth between the optical film and the light guide plate, and the same time, concentrating most light energy to the frontal and normalized view angle. Thereby, the frontal bright of the backlight system can be enhanced by the use of a single optical film.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical film, comprising:
an entrance surface, for receiving an incident light where it is refracted inside the optical film to form a refracted optical field; and
an exit surface, having a plurality of microstructures formed thereon, each microstructure being configured with a first curved surface and a second curved surface, for collecting the refracted optical field to a frontal and normalized view angle of the exit surface where it is emitted;
wherein, the incident light is composed of a first sub-field and a second sub-field while enabling a specific included angle, ranged between −50 degrees to −80 degrees, to be formed between the normal of the energy peak of the first sub-field and the normal of the entrance surface, and another specific included angle, ranged between 50 degree and 80 degree, to be formed between the normal of the energy peak of the second sub-field and the normal of the entrance surface.

2. The optical film of claim 1, wherein the first and the second curved surfaces are defined by a curvature function selected from the group consisting of a planar function, a spherical function and an irregular curved surface function.

3. The optical film of claim 1, wherein the first and the second curved surface are defined by the same curvature function.

4. The optical film of claim 1, wherein the first and the second curved surface are defined by different curvature function.

5. The optical film of claim 1, wherein the first and the second curved surfaces are connected by at least a third curved surface.

6. The optical film of claim 5, wherein each third surface is defined by a curvature function selected from the group consisting of a planar function, a spherical function and an irregular curved surface function.

7. The optical film of claim 1, wherein each microstructure is extending following a track defining by a function selected from the group consisting of a linear function and a curve function.

8. The optical film of claim 1, wherein the height of each microstructure is formed in a manner selected from the group consisting of: enabling the height to remain unchanged along with the extending of the same, and enabling the height of the microstructure to undulate along with the extending of the same.

9. The optical film of claim 1, wherein the extending track of any of the plural microstructures is different from those of its neighboring microstructures.

10. The optical film of claim 1, wherein the heights of different microstructures are different.

11. The optical film of claim 1, wherein the first sub-field is refracted by the entrance surface to form a first refracted light while directing the first refracted light to be emitted out of the optical film from the first curved surface, and thus forming a first output light in a manner that the relationship between the incident angle of the first sub-field and the incident angle of the first refracted light at the first curved surface is defined by a function for collecting the first output light to the frontal and normalized view angle.

12. The optical film of claim 1, wherein the second sub-field is refracted by the entrance surface to form a second refracted light while directing the second refracted light to be emitted out of the optical film from the second curved surface, and thus forming a second output light in a manner that the relationship between the incident angle of the second sub-field and the incident angle of the second refracted light at the second curved surface is defined by a function for collecting the second output light to the frontal and normalized view angle.

13. A backlight system, comprising:
a planar light source; and
an optical film, being arranged at a side of the planar light source for receiving an incident light provided by the planar light source and being comprised of:
an entrance surface, for receiving an incident light where it is refracted inside the optical film to form a refracted optical field; and
an exit surface, having a plurality of microstructures formed thereon, each microstructure being configured with a first curved surface and a second curved surface for collecting the refracted optical field to a frontal and normalized view angle of the exit surface where it is emitted;
wherein, the incident light is composed of a first sub-field and a second sub-field while enabling a specific included angle, ranged between −50 degrees to −80 degrees, to be formed between the normal of the energy peak of the first sub-field and the normal of the entrance surface, and another specific included angle, ranged between 50 degree and 80 degree, to be formed between the normal of the energy peak of the second sub-field and the normal of the entrance surface.

14. The backlight system of claim 13, wherein the first and the second curved surfaces are defined by a curvature function selected from the group consisting of a planar function, a spherical function and an irregular curved surface function.

15. The backlight system of claim 13, wherein the first and the second curved surface are defined by the same curvature function.

16. The backlight system of claim 13, wherein the first and the second curved surface are defined by different functions.

17. The backlight system of claim 13, wherein the first and the second curved surfaces are connected by at least a third curved surface.

18. The backlight system of claim 17, wherein each third surface is defined by a curvature function selected from the group consisting of a planar function, a spherical function and an irregular curved surface function.

19. The backlight system of claim 13, wherein each microstructure is extending following a track defining by a function selected from the group consisting of a linear function and a curve function.

20. The backlight system of claim 13, wherein the height of each microstructure is formed in a manner selected from the group consisting of: enabling the height to remain unchanged along with the extending of the same, and enabling the height of the microstructure to undulate along with the extending of the same.

21. The backlight system of claim 13, wherein the extending track of any of the plural microstructures is different from those of its neighboring microstructures.

22. The backlight system of claim 13, wherein the heights of different microstructures are different.

23. The backlight system of claim 13, wherein the planar light source is a light source selected from the group consisting of a light emitting diode and a cold cathode fluorescent lamp.

24. The backlight system of claim 13, wherein the first sub-field is refracted by the entrance surface to form a first refracted light while directing the first refracted light to be emitted out of the optical film from the first curved surface, and thus forming a first output light in a manner that the relationship between the incident angle of the first sub-field and the incident angle of the first refracted light at the first curved surface is defined by a function for collecting the first output light to the frontal and normalized view angle.

25. The backlight system of claim 13, wherein the second sub-field is refracted by the entrance surface to form a second refracted light while directing the second refracted light to be emitted out of the optical film from the second curved surface, and thus forming a second output light in a manner that the relationship between the incident angle of the second sub-field and the incident angle of the second refracted light at the second curved surface is defined by a function for collecting the second output light to the frontal and normalized view angle.

* * * * *